United States Patent [19]
Diefenderfer

[11] 4,070,545
[45] Jan. 24, 1978

[54] MULTIDIRECTIONAL REPEATER

[75] Inventor: Charles George Diefenderfer, Elkins Park, Pa.

[73] Assignee: Honeywell Inc., Minneapolis, Minn.

[21] Appl. No.: 727,760

[22] Filed: Sept. 29, 1976

[51] Int. Cl.$^2$ .......................... H04L 5/00; H04L 25/20
[52] U.S. Cl. .......................................... 178/73; 178/50
[58] Field of Search ................... 178/58 A, 58 R, 2 C, 178/2 D, 2 E, 2 R, 73; 325/40; 340/346, 147 LP

[56] References Cited

U.S. PATENT DOCUMENTS

| | | | |
|---|---|---|---|
| 3,435,142 | 3/1969 | Crowson et al. | 178/73 |
| 3,443,022 | 5/1969 | Benowitz et al. | 178/2 R |
| 3,544,719 | 12/1970 | Kahlbrock | 178/73 |

*Primary Examiner*—Thomas A. Robinson
*Attorney, Agent, or Firm*—Laurence J. Marhoefer; Lockwood D. Burton; Mitchell J. Halista

[57] ABSTRACT

A communication system for repeating a data signal received on one input/output line onto one or more other input/output lines while inhibiting the data signal repetition on the input/output line having input data being received thereon. The first bit of the incoming data signal is detected to generate a control signal for a line selector latch. The line selector latch latches in response to the control signal with the appropriate incoming line identification stored therein. This stored line identification is used to control a multiplexer which selects the corresponding one of a plurality of input signal detectors connected to respective input-output lines to supply an input signal to a signal repeater. The stored line identification also generates an inhibit signal to inhibit operation of a line output driver associated with the input/output line on which the incoming data was detected. An output signal from the signal repeater and timing signals are applied to a signal shaping circuit to develop input signals for the line output drivers to repeat the data signal by all uninhibited line output drivers.

3 Claims, 6 Drawing Figures

FIG. I

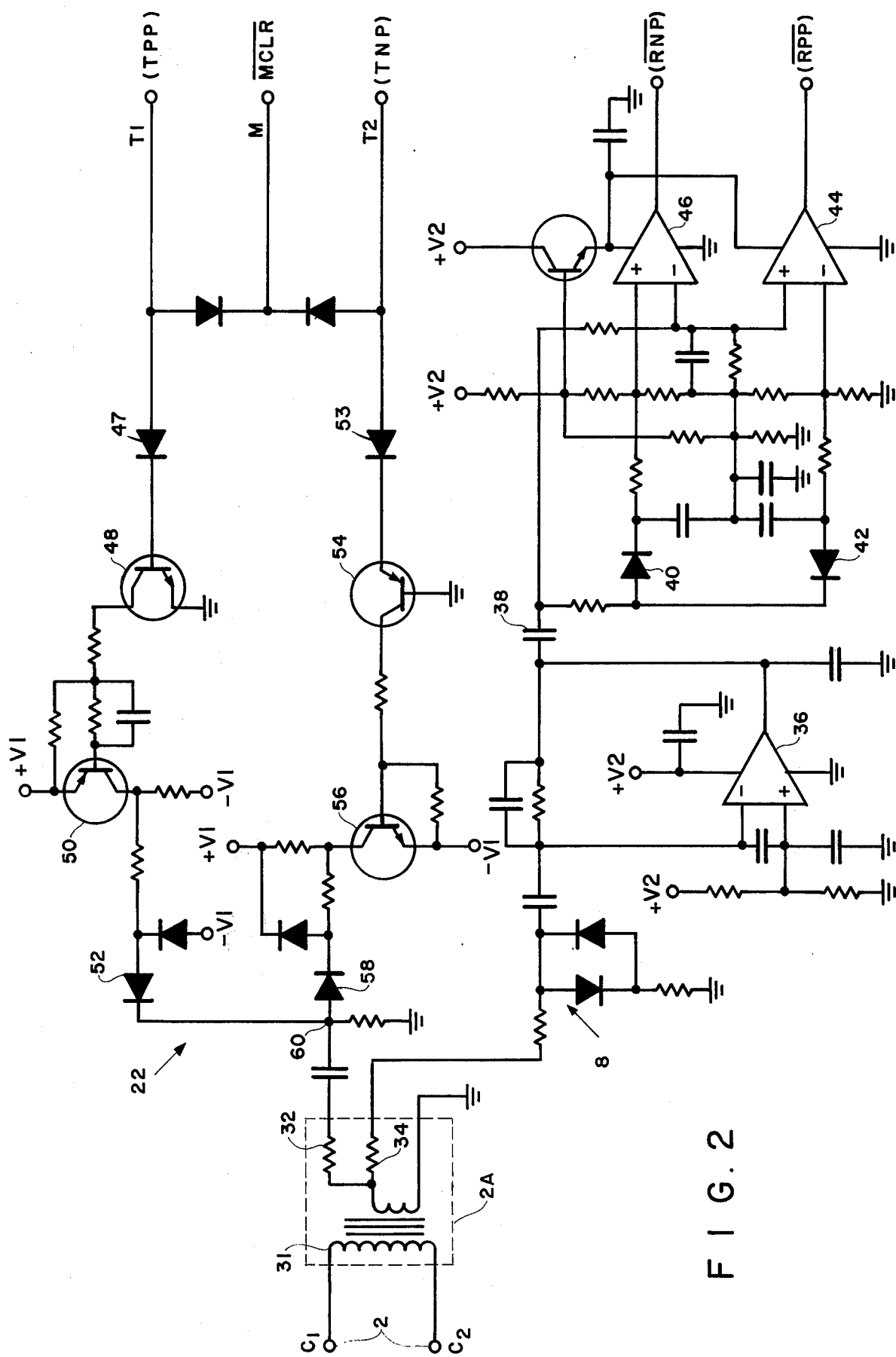
F I G. 2

MULTIDIRECTIONAL REPEATER

BACKGROUND OF THE INVENTION

1. Field of the Invention

The present invention relates to communication systems. More specifically, the present invention is directed to a multidirectional repeater for repeating incoming data on a plurality of output lines while inhibiting the line driver associated with the incoming data line.

2. Description Of The Prior Art

A conventional repeater circuit in the communication system is employed to repeat input data received on an input line onto one or more separate output lines. In such a basic system, the function of the input line and the output lines are separate and are not interchangeable. However, in a communication system where the output lines may be also used as input lines to the signal repeater, the problem of repeating data received on one input/output line onto one or more of the other input/output lines requires a selection of the input/output lines onto which the data is to be repeated while inhibiting of the input data transmission with respect to the input/output line on which the input data was received. Failure to inhibit the line driver associated with the input/output line on which the input data was received will result in overwriting the input data with repeated information. Further, failure to select the appropriate transmitters for producing the output data from the repeater will result in repetition of the data being originated by the repeater.

SUMMARY OF THE INVENTION

An object of the present invention is to provide a multidirectional repeater circuit for repeating input data on a plurality of input/output lines while inhibiting the repeating of input data on the incoming data line to prevent overwriting of input data on the input data receiving line.

In accomplishing this and other objects, there has been provided, in accordance with the present invention, a multi-directional repeater circuit having signal repeater means arranged to repeat an input signal on a plurality of input/output signal lines and means for detecting the first bit of an incoming data signal for developing an inhibit signal, and means for applying the inhibit signal to the repeater means for inhibiting the operation of the repeater means with respect to the input/output line on which input data is being received.

BRIEF DESCRIPTION OF THE DRAWINGS

A better understanding of the present invention may be had when the following detailed description is read in connection with the accompanying drawings, in which:

FIG. 1 is a block diagram of a multidirectional repeater system embodying the present invention and FIG. 2 is a detailed schematic of the input signal line driver and detector elements used in the system shown in FIG. 1.

DESCRIPTION OF THE PREFERRED EMBODIMENT

DETAILED DESCRIPTION

Figure 1:
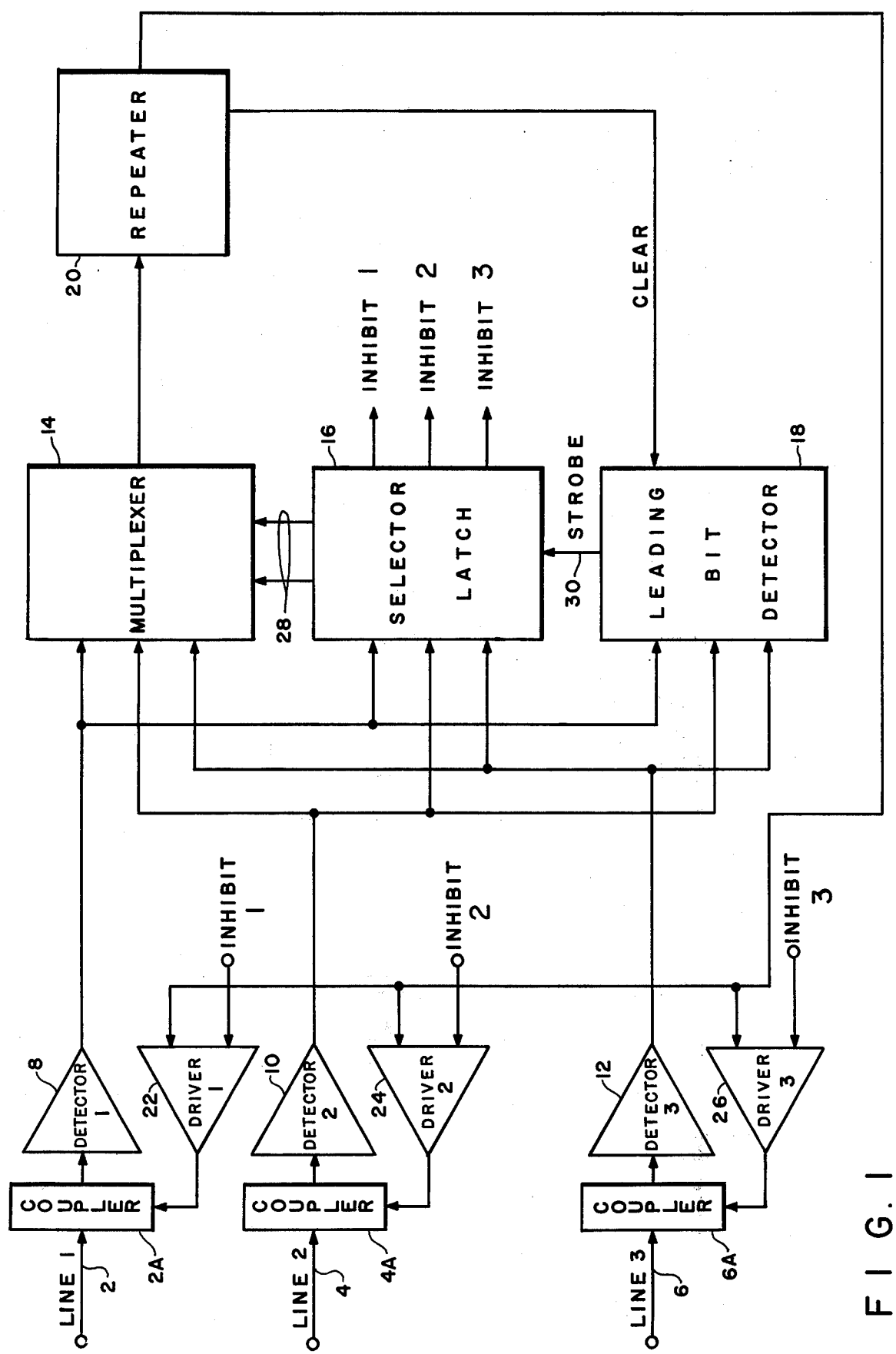

Referring to FIG. 1 in more detail there is shown a block diagram of a multidirectional repeater circuit embodying the present invention and having a plurality of input lines, e.g., input lines 2, 4, and 6. While the repeater circuit of the present invention is shown in a specific embodiment for use with three input lines, it should be noted that the circuit can be easily modified to handle other numbers of input lines. However, the specific number of the circuit elements which are governed by the number of input lines are shown in drawings and discussed hereinafter only in relation to the specific embodiment shown herein having three input lines. The input lines 2, 4, and 6 are connected through respective signal couplers 2A, 4A, and 6A to respective ones of a plurality of input signal detectors 8, 10 and 12. The outputs from the input signal detectors 8, 10 and 12 are concurrently applied to respective input circuits of a multiplexer 14, a selector latch 16 and a leading bit detector circuit 18. The output from the multiplexer 14 which is an N to 1 multiplexer is connected to the input of a signal repeater circuit 20. The output signal of the repeater circuit 20 is applied to all of a plurality of line drivers 22, 24 and 26. The line drivers 22, and 26 are each connected to respective ones of the signal lines 2, 4 and 6 through the signal couplers 2A, 4A and 6A, respectively. The output of the selector latch 16 is a plurality of output "inhibit" signals on respective output lines. These output lines are connected to "inhibit" inputs of respective ones of the line drivers 22, 24 and 26. Specifically, a first "inhibit" signal from the selector latch 16 is applied to an "inhibit" input of a first line driver 22, a second "inhibit" signal is applied to a second line driver 24 and a third inhibit signal is applied to a third line driver 26.

A second output signal from the selector latch 16 is a control signal for the multiplexer 14 applied over connecting selector latch output lines 28. An output signal from the leading bit detector is a "strobe" or an enabling signal for the selector latch circuit 16 applied over a strobe line 30. Finally a "clear" signal from the repeater 20 is applied to the leading bit detector 18 to clear the leading bit detector 18 in preparation for the next input message.

Mode Of Operation

The input data detected on any one of the input lines 2, 4, and 6 by the appropriate one of the input signal bit detectors 8, 10, and 12 is applied concurrently to the leading bit detector 18, the selector latch 16 and the multiplexer 14. The leading bit detector 18 detects the first bit of an incoming message and generates a "strobe" signal for the selector latch 16. The selector latch 16 then latches, or sets, with the appropriate line identification of the incoming data line stored therein. This latched data line identification is applied over the multiplexer control lines 28 to the multiplexer 14 to control the multiplexer 28 whereby the appropriate detector output signal corresponding to the incoming data line is applied to the repeater 20.

The selector latch 16 also generates an "inhibit" signal over an appropriate one of the first, second or third inhibit lines to prevent operation of the line driver associated with the input/output line on which the incoming data was detected. On the other hand, the other ones of the line drivers 22, 24 and 26 are not inhibited and are operated by the repeater 20 through the signal shaper 21 to repeat the incoming message on the data input/output lines associated therewith. For example, an incoming message on the first data input/output line 2 would be effective to generate a first inhibit signal for inhibiting the first line driver 22. The output from the input bit detector 8 would be applied through the multiplexer 14 to the repeater 20 to be subsequently applied through the signal shaper 21 to all of the line drivers 22, 24 and 26. However, inasmuch as the line driver 22 would be inhibited, only the other line drivers 24 and 26 would be allowed to apply the repeated message to their associated input/output signals lines 4 and 6, through the signal couplers 4A and 6A, respectively.

Upon the end of a message from the repeater 20, a "clear" signal is applied to the leading bit detector 18 to clear the leading bit detector 18 whereby the "strobe" signal is terminated to terminate the "inhibit" signals being applied to the line drivers 22, 24 and 26. The circuit, accordingly is, thus, prepared for the reception of a subsequent input signal on one of the input lines 2, 4 and 6.

In FIG. 2, there is shown a detailed schematic illustration of a detector/driver circuit and a signal coupler suitable for use in the repeater system shown in FIG. 1. The reference numbers 2, 2A, 8 and 22 are used in FIG. 2 as a representative example of the similarly numbered units shown in FIG. 1. The signal coupler 2A includes a transformer 31 having an input winding connected to the input/output line 2 and an output winding connected to the driver 22 through a first isolating resistor 32 and to the detector 8 through a second isolating resistor 34.

The input signal detector 8 includes a first amplifier 36 for amplifying the input signals received from the input line 2 through the coupler 2A. The output of the amplifier 36 is coupled by a coupling capacitor 38 to an output circuit for separating and amplifying the positive and negative signals received over the data input lines 2. A pair of diodes 40 and 42 are both connected to the coupling capacitor 38 and are oppositely poled to separate the polarities of the amplified input signals. The separated polarity signals are each applied to respective output amplifiers 44 and 46. The output amplifiers 44 and 46 each also function as threshhold detectors by comparing the respective input signals applied thereto to a reference level derived from a source +V. The output of the first output amplifier 44 is representative of the positive polarity input data RPP (reply positive polarity) while the output of the second amplifier 46 is representative of the negative polarity input data RNP (reply negative polarity).

Conversely, the signal line driver 22 of the first detector/driver 8, 22 is arranged to receive positive and negative input signals to be applied to the selected output line. The positive input signal TPP (transmit positive polarity) is applied through a first polarity isolating diode 47 to the base of a transistor amplifier 48. The output from the transistor amplifier 48 is applied to the input of a second transistor amplifier 50. The output from the second transistor amplifier 50 is applied through a second polarity isolating diode 52 (poled similarly to the first polarity isolating diode 47) to the isolating resistor 32 to be applied to the secondary side of the coupling transformer 31. Similarly, the negative output pulse to be applied to a data line, TNP (transmit negative polarity), is applied through a third isolating diode 53 to a first transistor amplifier 54, the output of which is applied to a second transistor amplifier 56. The output of the second transistor amplifier 56 is connected by a fourth isolating diode 58 poled oppositely to the third diode 53 to a common junction point 60, with the aforesaid positive output signal, to be coupled to the secondary of the coupling transformer 31. Thus, the positive and negative signals to be transmitted are separately amplified and are applied to the coupling transformer 2A to be transmitted to the data signal line 2. A master clear signal, $\overline{MCLR}$, is applied to all of the driver circuits to inhibit the application of output signals to the output lines 2 by blocking the transmit signals TPP and TNP. Specifically, the $\overline{MCLR}$ signal is arranged to forward bias a diode circuit connected to the TPP and TNP input lines to bypass these signals around the driver 22. This master clear, signal $\overline{MCLR}$, may be an externally generated signal which is selectively used to inhibit any output signal from the repeater circuit of the present invention.

Figure 3:
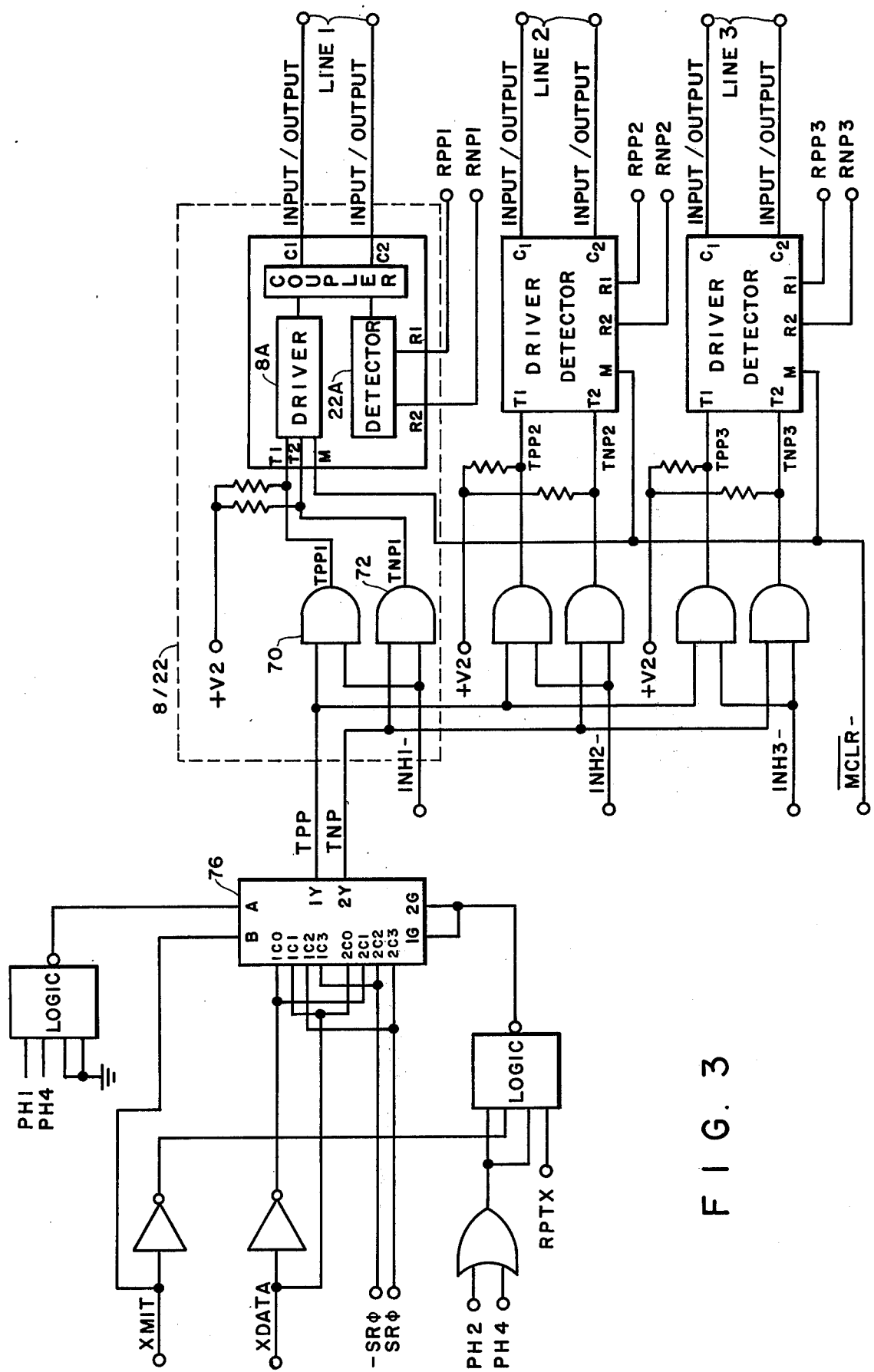
FIGS. 3, 4 and 5 are each detailed logic diagrams of respective portions of the repeater system shown in FIG. 1.
Figure 7:
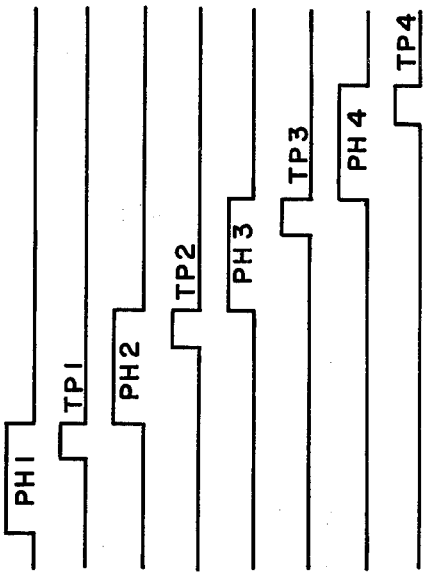
FIG. 6 is a block diagram of a clock generator circuit suitable for use with the present invention and FIG. 7 is a waveshape diagram of the output signals from the clock generator circuit of FIG. 6.

In FIG. 3, there is shown an expanded block diagram of the portion of the repeater circuit of the present invention utilizing a plurality of the detector-driver circuits 8 and 22 shown in detail in FIG. 2. The detector-driver combined circuitry including the inhibit signal inputs (MCLR), discussed above, is identified as detector-driver 8/22 in FIG. 3 in order to provide a cross-reference to the circuitry shown in FIGS. 1 and 2. The inhibit signals for each of the detector-driver combination circuits are applied to a pair of AND gates, AND gates 70 and 72 shown in the exemplary embodiment of the detector-driver combination 8/22. Each of the AND gates 70, 72 receives an "inhibit" signal and either the positive signal to be transmitted, TPP or the negative signal to be transmitted, TNP. The output signals from the AND gates 70 and 72 are applied to respective ones of the detector-driver input terminals T1 and T2. A similar arrangement is used for the other detector-driver combinations which are asspciated with data input/output lines 2 and 3. The positive signal to be transmitted, TPP, and the negative signal to be transmitted, TNP, are the output signals from the repeater circuit 20 including a conventional multiplexer circuit 76 which may be a commercially available integrated circuit such as that identified as 74153 and manufactured by Texas Instruments, Houston, Tex. The input signals to the signal routing multiplexer 76 are timing signals, shown in FIG. 7 which are derived from a clock signal generator circuit shown in block diagram form in FIG. 6 with their use discussed hereinafter, and control signals SR$\phi$ and $-$SR$\phi$ and RPTX which are derived from other parts of the repeater circuit shown in FIGS. 4 and 5. Thus, the multiplexer 76 is arranged to produce a reproduction of the received input signal by utilizing portions of the timing signals applied to it.

Figure 4:
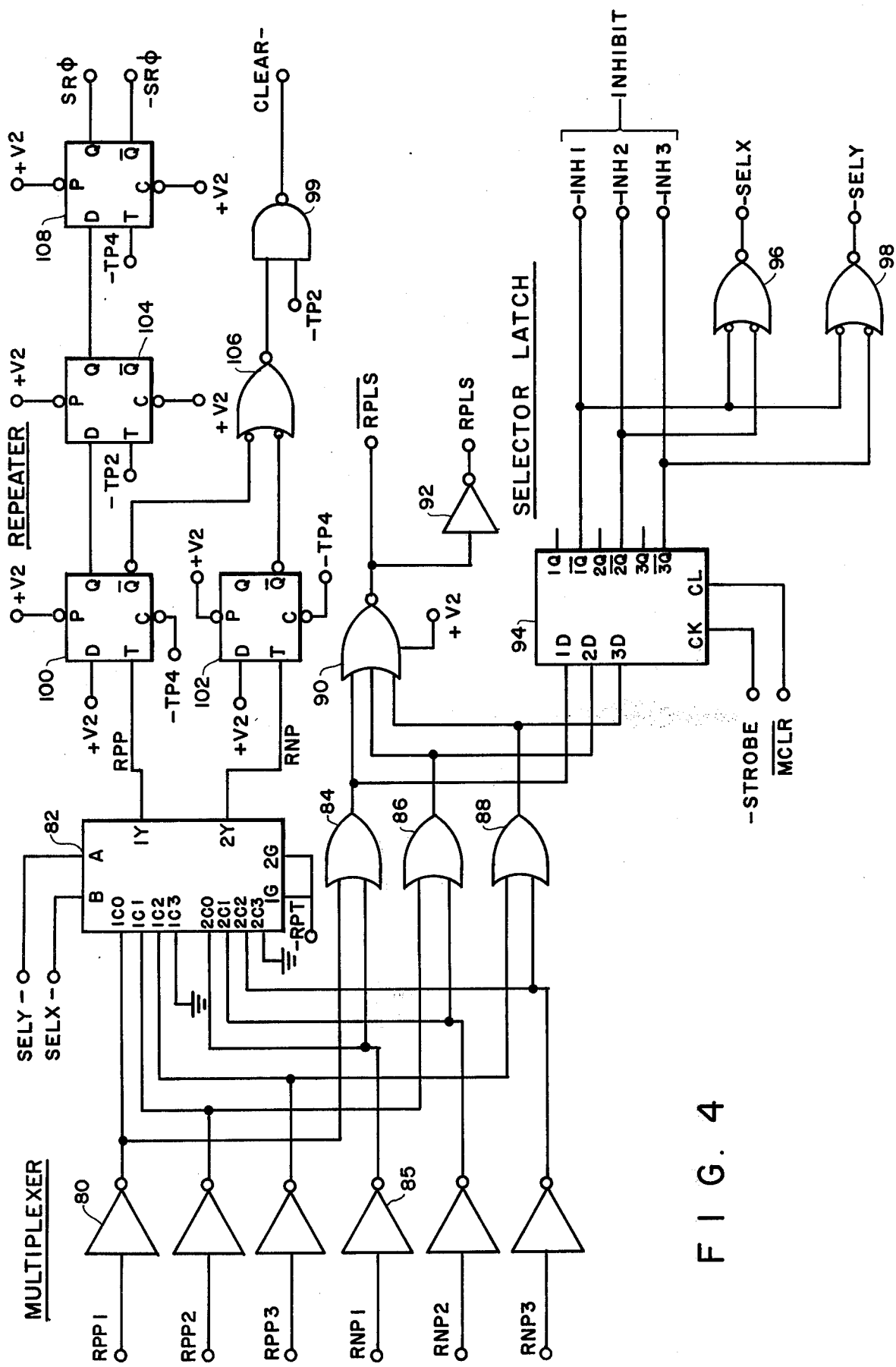

In FIG. 4, there is shown a block diagram representation of the input signal multiplexer 14, the repeater 20 and the selector latch 16 parts of the repeater system shown in FIG. 1. The output signals from the detector circuits which are generally designated as RNP and RPP with the associated numbers indicating the input lines are each applied through a respective logical inverter to the respective inputs of a multiplexer circuit which may be the same commercially available 74153 unit discussed above with respect to multiplexer 76. For example, the received positive signal RPP1 from the first data line is applied through a first logical inverter 80 to a first input of the multiplexer unit 82. Concurrently, the output of the logical inverter 80 is also applied as a first input to a two input OR gate 84. The second input of the two input OR gate 84 and another input for the multiplexer 82 is obtained from the output of a logical inverter 85 having the received negative pulse RNP1 from the data input/output line 1 applied thereto. Similarly, the received positive pulses from lines 2 and 3 are applied through respective logical inverters to the multiplexer 82 and in combinations of positive and negative pulses to corresponding OR gates 86 and 88. The output from the OR gates 84, 86 and 88 are each applied to respective inputs of a NOR gate 90. The output of the NOR gate 90 is a signal labeled $\overline{RPLS}$ while the same signal inverted by a logical inverter 92 is labeled RPLS.

The outputs of the OR gates 84, 86 and 88 are, also, applied to a selector latch circuit 94 which may be a conventional unit identified as a 74175 as manufactured by Texas Instruments. The selector latch is arranged to decode the presence of an input signal applied on one of its input lines into an output signal on one of three output lines identified as INH1, INH2 and INH3. These output signals are used as inhibit signals for the detector-driver circuits shown in FIGS. 1, 2 and 3. In other words, the input line signal is used to generate an inhibit signal to prevent retransmission from the detector-driver circuits on the input/output line on which the input signal was received. The output signals from the selector latch 94 are applied to a pair of NOR gates 96 and 98 to be decoded into a pair of multiplexer control signals, SELX and SELY. These control signals, SELX, SELY, are applied to the multiplexer 82 to select one of the positive and negative input signals applied to the multiplexer 82 which are representative of the detected input signal being applied to the repeater circuit of the present invention. Thus, the positive input signal is selected by the multiplexer 82 in response to the control signals from the selector latch 94 and is applied to the control input of a first "D" flip-flop 100. Concurrently, the negative input signal is selected by the multiplexer 82 and is applied to the control input of a second "D" flip-flop 102. The Q output of the first D flip-flop 100 is applied to the "D" input of a third D flip-flop 104 having the timing signal TP2-applied to the control input thereof. The $\overline{Q}$ outputs of the first and second flip-flops 100 and 102 are applied to a NOR gate 106. The output of the NOR gate 106 is applied with the timing signal −TP2 to a NAND gate 99 to develop a CLEAR - signal for use as discussed hereinafter. Concurrently, the "Q" output of the third flip-flop 104 is applied to the "D" input of a fourth D flip-flop 108 having a timing signal TP4 applied to its control input. The "Q" and "$\overline{Q}$" outputs of the fourth flip-flop 108 are used as SR$\phi$ and −SR$\phi$ control signals as discussed hereinafter.

Figure 5:
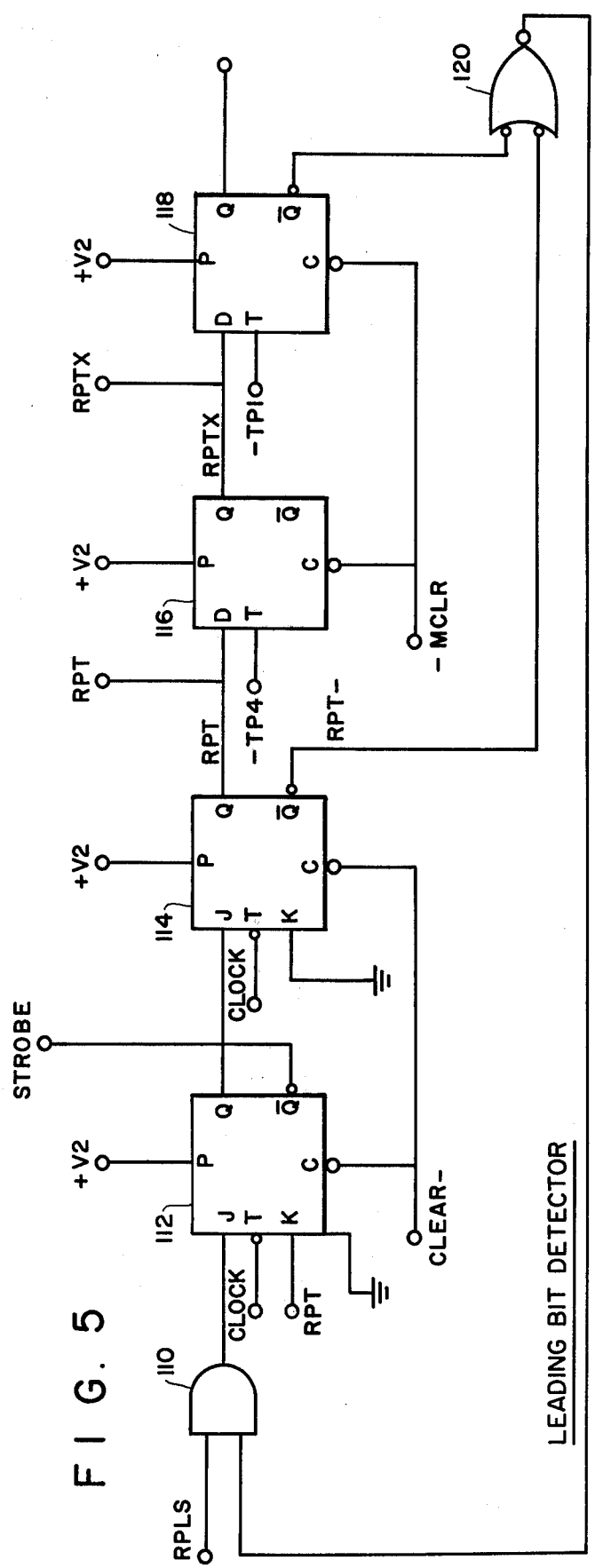
Figure 6:
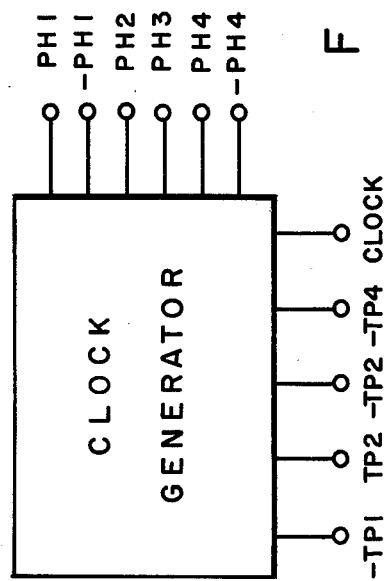

The leading bit detector circuit shown in FIG. 5 is arranged to detect the first bit of an input signal which is represented by the RPLS signal from the logical inverter 92 shown in FIG. 4. This input signal RPLS is applied to an AND gate 110 in combination with a feedback signal from the output of the selector latch circuit as discussed hereinafter. The output of the AND gate 110 is applied to a "J" input of a first J-K flip-flop 112 having a clock timing signal from the clock generator of FIG. 6 applied to its control input. Concurrently, a feedback RPT signal is applied to its "K" input and the "clear" input is connected to the source of the "Clear−" signal shown in FIG. 4. The $\overline{Q}$ output of the first J-K flip-flop 112 is designated a "Strobe" signal and is applied to the selector latch 94 to latch this circuit to a state for producing an inhibit signal representing a received input signal. Further, this "Strobe" signal is applied to the strobe input of the clock generator shown in FIG. 6 to enable it to produce its timing output signals.

The "Q" output of the first J-K flip-flop 112 is applied to the "J" input of a second J-K flip-flop 114 having its K input grounded, its control input connected to the "Clock" signal and its "Clear" input connected to the "Clear−" source in FIG. 4. The "Q" output of the second J-K flip-flop 114 is designated as an RPT signal and is also applied to the "D" input of a first D flip-flop 116 having its control input connected to the TP4 signal source and its "Clear" input connected to a source of a clear signal $\overline{MCLR}$. The "Q" output of the first D flip-flop 116 is designated as an RPTX signal and is connected to the "D" input of a second D flip-flop 118 having its control input connected to the TP1 signal source and its "Clear" input connected to the clear signal $\overline{MCLR}$. The $\overline{Q}$ output of the second D flip-flop 118 is connected to one input of a NOR gate 120. The $\overline{Q}$ output of the second flip-flop 114 is connected to another input of the NOR gate 120. The output of the NOR gate 120 is applied as the feedback signal to another input of the AND gate 110. Thus, the leading bit detector develops a "Strobe" signal when the first bit of the input signal RPLS is applied to the AND gate 110. Subsequently, the detector circuit develops additional control signals RPT and RPTX in response to timing signals from the clock generator shown in FIG. 6. The detailed operation of the circuit shown in FIG. 5 is conventional and no further discussion is believed to be necessary. In summary, the leading bit detector is supplied with an input signal representative signal RPLS from the input signal detecting circuit shown in FIG. 4.

The RPLS signal in combination with the timing and clock signals generates a plurality of control signals, i.e., strobe, RPT and RPTX which are used to control the selector latch 16, the multiplexer 14, and the repeater 20. Specifically, the strobe signal starts the clock generator to generate the timing signals and it latches the selector latch 94 to store an identification of the input line on which the input signal is being received. The output of the selector latch 94 is an inhibit signal to the corresponding ones of the line drivers to inhibit the one connected to an input/output line on which an input signal is being received. The selector latch 16 also produces the SELX- and SELY- signals to control the multiplexer 82 to connect the input detector output signal to the repeater circuit. The repeater circuit and the signal shaper 21 under control of the timing signals, the SELX- and SELY- signals and bit detector circuit output RPTX signal apply either a positive transmit TPP signal or a negative TNP signal to all of the line drivers. The line drivers, with the exception of the inhibited line driver, apply their input signal to their respective output lines whereby the input message is repeated on all of the output lines except the line on which the input signal is being received.

Accordingly, it may be seen that there has been provided, in accordance with the present invention, an improved half-duplex communication system for repeating input data on a plurality of input/output lines while inhibiting the repeating of the incoming data on the input line on which it is being received.

The embodiments of the invention in which an exclusive property or privilege is claimed are defined as follows:

1. A communication system comprising
   a plurality of input/output terminals,
   a plurality of signal detectors, each of said detectors having an input connected to a respective one of said input/output terminals, and an output,
   a leading bit detector connected to the outputs of all of said input signal detectors to produce an output signal representative of the start of an input signal thereto,
   selector latch means connected to said input signal detectors and said leading bit detector and arranged to be controlled by an output signal from said leading bit detector means to develop an inhibit signal from the output signals of said input signal detectors representative of an input signal detected by said input signal detectors,
   multiplexer means connected to said input signal detectors and to said selector latch means to select an output signal from one of said input signal detectors in response to an output signal from said selector latch means,
   signal repeater means connected to said multiplexer means to produce an output signal corresponding to an output signal from an input signal detector selected by said multiplexer means and
   a plurality of input/output line driver means each having an output connected to respective ones of said input/output lines and an input connected to said multiplexer means, said line driver means being connected to said selector latch to have said inhibit signals applied to respective ones of said line driver means to inhibit a line driver connected to the one of said input/output terminal receiving an input signal.

2. A communication system as set forth in claim 1 wherein said signal repeater means including signal selection means arranged to produce a reproduction of said output signal from said input signal detectors in response to an output signal from said multiplexer means.

3. A communication system as set forth in claim 1 wherein said input/output terminals each include coupler means for coupling an input of each input signal detector to an output of a respective one of said line driver means while providing substantial signal isolation therebetween.

* * * * *